US008090681B2

(12) United States Patent
Lukiyanov et al.

(10) Patent No.: US 8,090,681 B2
(45) Date of Patent: Jan. 3, 2012

(54) RESOLVING CONFLICTS IN CONTENT MANAGEMENT SYSTEMS

(75) Inventors: Maxim Lukiyanov, Kirkland, WA (US); Arulseelan Thiruppathi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 559 days.

(21) Appl. No.: 12/146,467

(22) Filed: Jun. 26, 2008

(65) Prior Publication Data
US 2009/0327358 A1 Dec. 31, 2009

(51) Int. Cl.
*G06F 7/00* (2006.01)
*G06F 17/00* (2006.01)
(52) U.S. Cl. ......... 707/609; 707/610; 707/625; 707/695
(58) Field of Classification Search .................. 707/610, 707/622, 625, 690, 694, 695, 609
See application file for complete search history.

(56) References Cited

U.S. PATENT DOCUMENTS

| 6,317,754 | B1 | 11/2001 | Peng |
| 6,898,642 | B2 | 5/2005 | Chafle et al. |
| 7,818,293 | B2 * | 10/2010 | Dullanty et al. ............. 707/610 |
| 7,970,743 | B1 * | 6/2011 | Kilday et al. ................. 707/689 |
| 2004/0172423 | A1 | 9/2004 | Kaasten et al. |
| 2005/0044187 | A1 | 2/2005 | Jhaveri et al. |
| 2006/0026305 | A1 * | 2/2006 | Illowsky et al. ................... 710/8 |
| 2006/0206882 | A1 * | 9/2006 | Illowsky et al. .............. 717/144 |
| 2006/0242206 | A1 | 10/2006 | Brezak et al. |
| 2007/0014314 | A1 | 1/2007 | O'Neil |
| 2007/0067349 | A1 | 3/2007 | Jhaveri et al. |
| 2007/0276836 | A1 | 11/2007 | Chatterjee et al. |
| 2008/0005195 | A1 | 1/2008 | Li |
| 2008/0034009 | A1 | 2/2008 | Freedman et al. |
| 2009/0006936 | A1 * | 1/2009 | Parker et al. ................... 715/200 |

OTHER PUBLICATIONS

Novik, et al., "Peer-to-Peer Replication in WinFS", Jun. 2006, 17 pages.
"Introducing Microsoft Sync Framework: Sync Services for File Systems", Nov. 2007, 8 pages.
Muthitacharoen, et al., "Ivy: A Read/Write Peer-to-Peer File System", 2002, 14 pages.

* cited by examiner

*Primary Examiner* — Don Wong
*Assistant Examiner* — Merilyn Nguyen
(74) *Attorney, Agent, or Firm* — Boswell IP Law; J. Mason Boswell

(57) ABSTRACT

A conflict resolution system is described for reducing false conflicts among entities synchronized within a content management system. A typical content management system maintains a version for an entity that is incremented each time an endpoint modifies the entity, including changes that affect the metadata rather than the content of the entity. The conflict resolution system adds a new content version that is updated when the content of the entity changes. By comparing content version information, endpoints can automatically resolve false conflicts that occur when an endpoint has modified the metadata of the entity.

10 Claims, 6 Drawing Sheets

RESOLVING CONFLICTS IN CONTENT MANAGEMENT SYSTEMS

BACKGROUND

Enterprise content management (ECM) refers to the technologies used to capture, store, preserve and deliver content and documents and content related to organizational processes. ECM tools and strategies allow the management of an organization's unstructured information, wherever that information exists. A subset of ECM is a content management system (CMS), which is computer software used to create, edit, manage, and publish content in a consistently organized fashion. CMSs are frequently used for storing, controlling, versioning, and publishing industry-specific documentation such as news articles, operators' manuals, technical manuals, sales guides, and marketing brochures. The content managed may include computer files, image media, audio files, electronic documents, and Web content. Another type of ECM is a document management system (DMS), which is a computer system (or set of computer programs) used to track and store electronic documents and/or images of paper documents. The term has some overlap with the concepts of Content Management Systems and is often viewed as a component of Enterprise Content Management Systems and related to Digital Asset Management, Document imaging, Workflow systems, and Records Management systems.

Current ECM systems are implemented as either client/server or peer-to-peer (P2P) applications. An example of a client/server ECM system is Microsoft SharePoint, a web-based collaboration and document management platform from Microsoft. Microsoft SharePoint can be used to host web sites that access shared workspaces and documents, as well as specialized applications like wikis and blogs from a browser. Microsoft SharePoint offers base collaborative infrastructure supporting HTTP- and HTTPS-based editing of documents, as well as document organization in document libraries, version control capabilities, wikis, and blogs. It also includes end-user functionality such as workflows, to-do lists, alerts and discussion boards, which are exposed as web parts to be embedded into SharePoint pages. Clients access a client/server ECM system using simple client software such as a browser. The server tracks documents checked out by each client and changes made to documents using versioning.

P2P ECM systems do not use a server, but instead exchange changes to documents between client peers. An example is Microsoft Office Groove, an application targeted at teams with members who are usually off-line or who do not share the same network security clearance. Groove is desktop software designed for the collaboration and communication of the members of small groups. A set of files to be shared plus some aids for group collaboration are placed in a shared workspace that a user can invite other users to join. By responding to an invitation, the invitee becomes an active member of the workspace and is sent a copy of the workspace that is installed on their hard disk drive. Data is encrypted both on disk as well as over the network, with each workspace having a unique set of cryptographic keys. Members interact and collaborate in the workspace, which is a private virtual location. Changes being made are tracked by Groove and all the copies are synchronized via the network in a P2P manner. When conflicts occur, users designated as editors inspect the conflicting changes and make an official change to the workspace that is distributed to members.

As various ECM systems gain popularity, documents can be simultaneously managed by more than one system. For example, a document shared using a client/server system such as Microsoft SharePoint may also be part of a P2P system such as Microsoft Office Groove. When a user makes a change, each of the systems synchronizes the changes to other users of the system. This can lead to unnecessary synchronization where one system appears to another system to have modified a document, even though no change occurs to the document content. For example, User A may make a change to the document, and then synchronize the change to the server of a client/server system. User A may then synchronize the change to User B using a P2P system. If User B is also a member of the client/server system, User B then attempts to synchronize the change to the server. The final change submitted by User B is redundant because User A has already sent the change to the server. However, the server typically has no way of knowing that the change is not new. The final change also appears to the server to conflict with User A's change, since the change is to the same document. Thus, extra synchronization can occur and the server or P2P system may invoke conflict resolution procedures for false conflicts that waste an editor's time.

SUMMARY

A conflict resolution system is described for reducing false conflicts among documents or other entities synchronized within an ECM or other type of CMS. A typical ECM maintains a single endpoint version that is incremented each time an endpoint modifies a document, including changes that affect the metadata rather than the content of the document. The conflict resolution system adds a new content version to the information tracked by each endpoint. The content version is updated when the content of a document changes. By comparing content versions, endpoints can automatically resolve false conflicts that occur when an endpoint has modified the metadata of the document.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
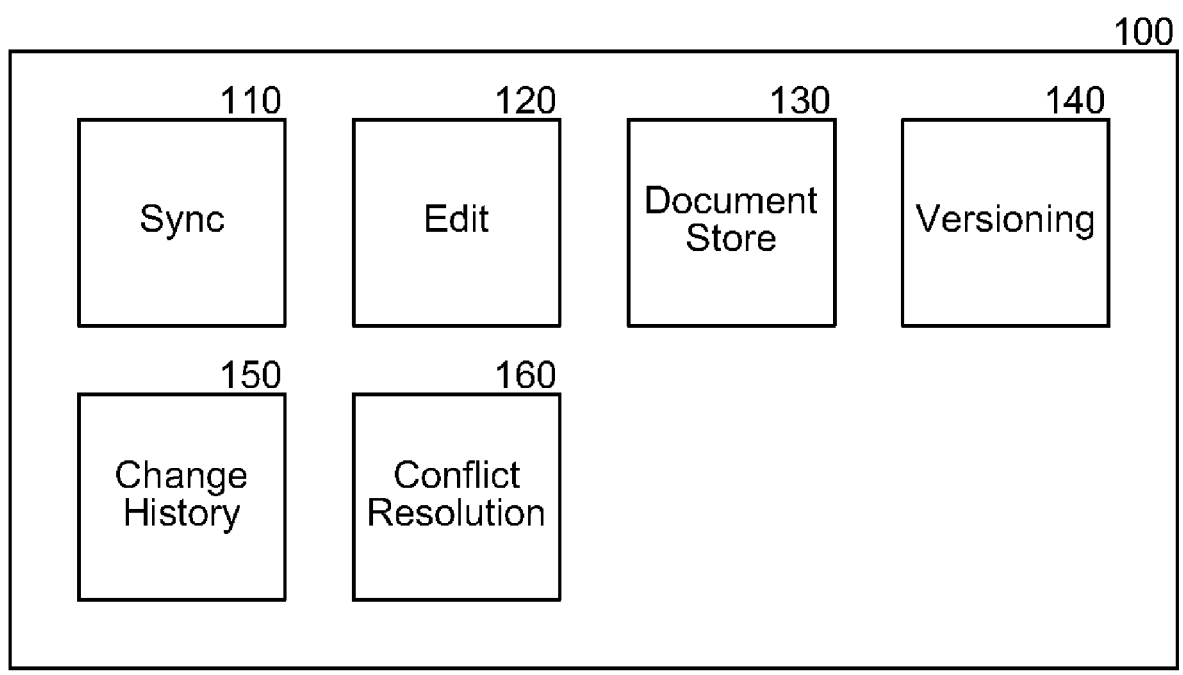
FIG. 1 is a block diagram that illustrates components of the conflict resolution system, in one embodiment.

A conflict resolution system is described for reducing false conflicts among documents or other entities synchronized within an ECM or other type of CMS. A typical ECM maintains a single server version that is incremented each time a change is made. The server tracks the most recent server version that a client receives when the client synchronizes with the server. If the client makes a change and again synchronizes with the server after another client has made a change, the ECM reports a conflict and prompts the user to manually resolve the conflict. The conflict resolution system adds a new content version to the information tracked by the server and clients. The content version is updated when the content changes with information about the client that made the change. In the scenario above, if the client synchronizing with the server reports a content version that is the same as the content version provided with the change from the other client (e.g., if the two clients previously synced using a P2P system), then there is a false conflict and the conflict resolution system automatically resolves the conflict without prompting the user. The server and clients may also track a chain of change history that can be used to determine the path taken by each document at any location within the system. The change history provides knowledge that allows any endpoint to potentially resolve false conflicts as described further herein. For example, if the synchronizing client in the example above reports a content version that is covered by the server or other client's knowledge (e.g., it is contained in the change history), then the system can treat the conflict as a false conflict. Thus, the conflict resolution system reduces false conflicts and saves the user time for doing tasks that are more productive.

Whenever an item on the server is updated, the server changes certain metadata of the item. For example, the server increments the server item version, records who updated the item, and records when the item was updated. The server may also trigger custom business logic that may result in further changes of the item metadata. The result is that the item is changed every time it is uploaded to the server, even though the content of the item does not change. Thus, the server version is not a reliable indicator of whether the item content has been changed.

In a P2P synchronization topology, clients synchronize data between each other without server interaction. In this scenario, more than one client may have updated the item since it was last synchronized with the server. Connectivity with the server may be lost temporarily (such as for a mobile device) even when connectivity with other clients is still available. For example, client A may change an item and synchronize it with client B. Client B may also change the item. When a connection to the server becomes available, both clients will try to upload the item to the server. The server modifies metadata of the item when the first client uploads its changes. The second client sees this as a new change that it does not know about and prompts the user to resolve the conflict. The conflict resolution system solves this problem by adding additional metadata to items in the server's data store that indicates when the content of an item was last modified. A client-server protocol is defined that uses this metadata to automatically resolve conflicts without data loss.

Every item in the data store is logically divided into two parts: content change unit and server change unit. For every part, a separate version property is used. The version of the server change unit, or server version, is updated when a limited, well-known subset of item metadata is changed. The version of the content change unit, or content version, is updated when any other part of the item is changed. If a client or server detects a conflict, they can resolve this conflict automatically as long as this conflict was created due to direct P2P synchronizations between clients and the item content was not actually modified by multiple users.

In the conflict situation, one synchronization end point (client or server) called "A" is trying to update an item stored on another synchronization end point called "B" while A has no information about the version of the item stored by "B". The conflict resolution system allows endpoint A to automatically resolve the conflict and successfully replace B's item when the content version of B's item is known to endpoint A. The server version can be ignored, although it may still be used by older clients.

FIG. 1 is a block diagram that illustrates components of the conflict resolution system, in one embodiment. The conflict resolution system 100 contains a sync component 110, an edit component 120, a document store component 130, a versioning component 140, a change history component 150, and a conflict resolution component 160. Each component may have subcomponents on both the client and the server to perform the functions described. Each of these components is described in further detail herein.

The sync component 110 handles sync requests between a client and server or between peers. The sync component 110 may track the identity of each client, the documents managed by the system 100, the latest version held by each client and so forth. For example, the sync component 110 may store the last time a client synchronized and the server and content versions received by the client during the synchronization. When a client requests to synchronize the latest information, the sync component 110 determines the changes that a client has not yet seen and sends the changes to the client so that the client is up to date.

The edit component 120 receives modifications to a document or other entity (e.g., spreadsheet, presentation, data file, to do item, announcement, wiki, and so forth) from a user. The edit component 120 may be external to the system 100 or integrated (as shown). The edit component 120 tracks modification made by the client and provides a new client version number for changes that a user makes. The edit component 120 also updates a client's local change history when a user makes a change.

The document store component 130 provides storage for the latest version of documents at a particular endpoint, including the server or individual clients. The document store component 130 may be a database, file system, flat file, or other suitable structure for storing documents and related metadata (e.g., change information).

The versioning component 140 manages the content version of each document that an endpoint stores. For example, the server tracks the identity of the last client that modified a document as well as the content version that the client assigned to the document. When other clients synchronize with the server, they use the content version number to determine whether their own content version differs and a conflict exists.

The change history component 150 manages a history of version information, sometimes referred to as knowledge. When a client or the server is determining whether a conflict has occurred, they can compare their own knowledge with the knowledge of an endpoint synchronizing a change to determine whether their own knowledge covers the knowledge of the endpoint that is performing the sync operation. For example, suppose Client A and B modify a document, and then Client C uploads a version of the document. If Client C's knowledge covers (or includes) the changes made by Clients A and B, then Client C's version of the document is the newest and there is no conflict. If on the other hand Client C is missing information about either the change from Client A or Client B, then there is a conflict and a user manually resolves the differences between Client C's change and the other client's change.

The conflict resolution component 160 handles the automatic and manual resolution of conflicts. The conflict resolution component 160 uses the information tracked by the versioning component 140 and the change history component 150 to determine whether a conflict really exists. For conflicts that do not affect the content, the conflict resolution component 160 can automatically resolve what is really a false conflict. The conflict resolution process is described further herein.

The computing device on which the system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the system, which means a computer-readable medium that contains the instructions. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
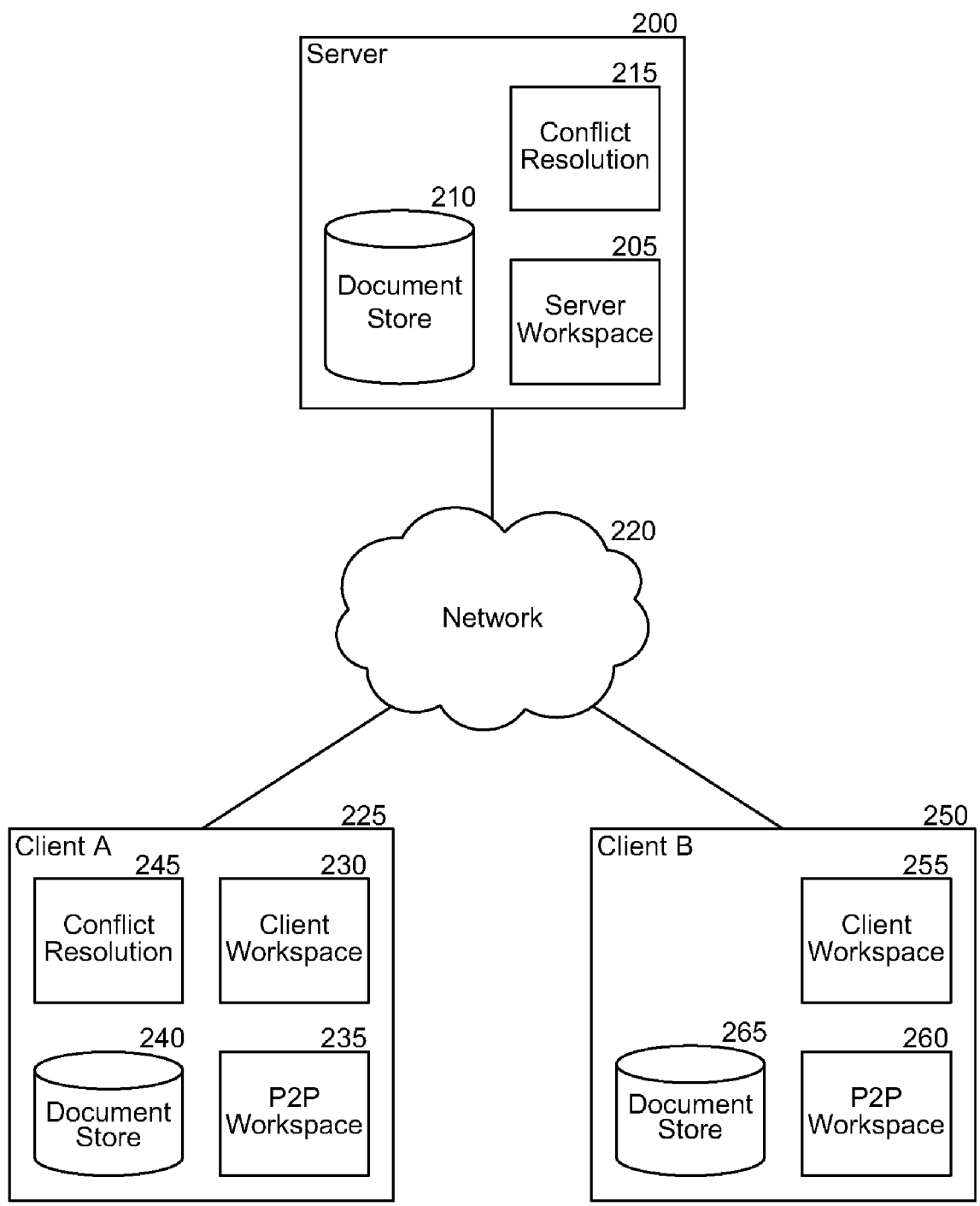
FIG. 2 is a block diagram that illustrates a typical operating environment of the conflict resolution system, in one embodiment.

FIG. 2 is a block diagram that illustrates a typical operating environment of the conflict resolution system, in one embodiment. A server 200 is connected via a network 220 to one or more clients, such as client 225 and client 250. The network 220 may be a network such as the Internet, a corporate local area network (LAN), mobile network, and so forth. Although each of the server 200 and clients 225 and 250 are shown attached to the same network, clients 225 and 250 may also be attached to a private network (not shown) that the server is not connected to, over which the clients 225 and 250 perform P2P synchronization.

The server 20 includes a server workspace 205, document store 210, and conflict resolution system 215. The server workspace 205 and document store 210 are typical of ECM systems and include the documents and state information for sharing documents among clients. The conflict resolution system 215 allows at least some conflicts that would previous prompt user intervention to be resolved automatically without user intervention.

The client 225 includes a client workspace 230, P2P workspace 235, document store 240, and conflict resolution system 245. The client workspace 230 includes client state information for synchronizing with server 200. For example, the client workspace 230 may include a Microsoft Office SharePoint Services workspace. The P2P workspace 235 includes state information for synchronizing with client 250. For example, the P2P workspace 235 may include a Microsoft Groove workspace. The document store 240 stores the version of documents held by the client 225. The document store 240 may be a file system or other suitable storage system on the client. A user of client 225 may modify the documents in the document store 240 and the client later synchronizes those changes to the server 200 and other clients (e.g., client 250).

The client 250 illustrates an older version client (e.g., a web browser or other client) that is not updated with the conflict resolution system. The client 250 includes a client workspace 255, P2P workspace 260, and document store 265, similar to those already described. The client 250 is still able to synchronize with the server 200 and client 225 using previously existing methods. However, the client 250 may have to resolve false conflicts that would be detected and handled automatically on newer clients by the conflict resolution system.

Figure 3:
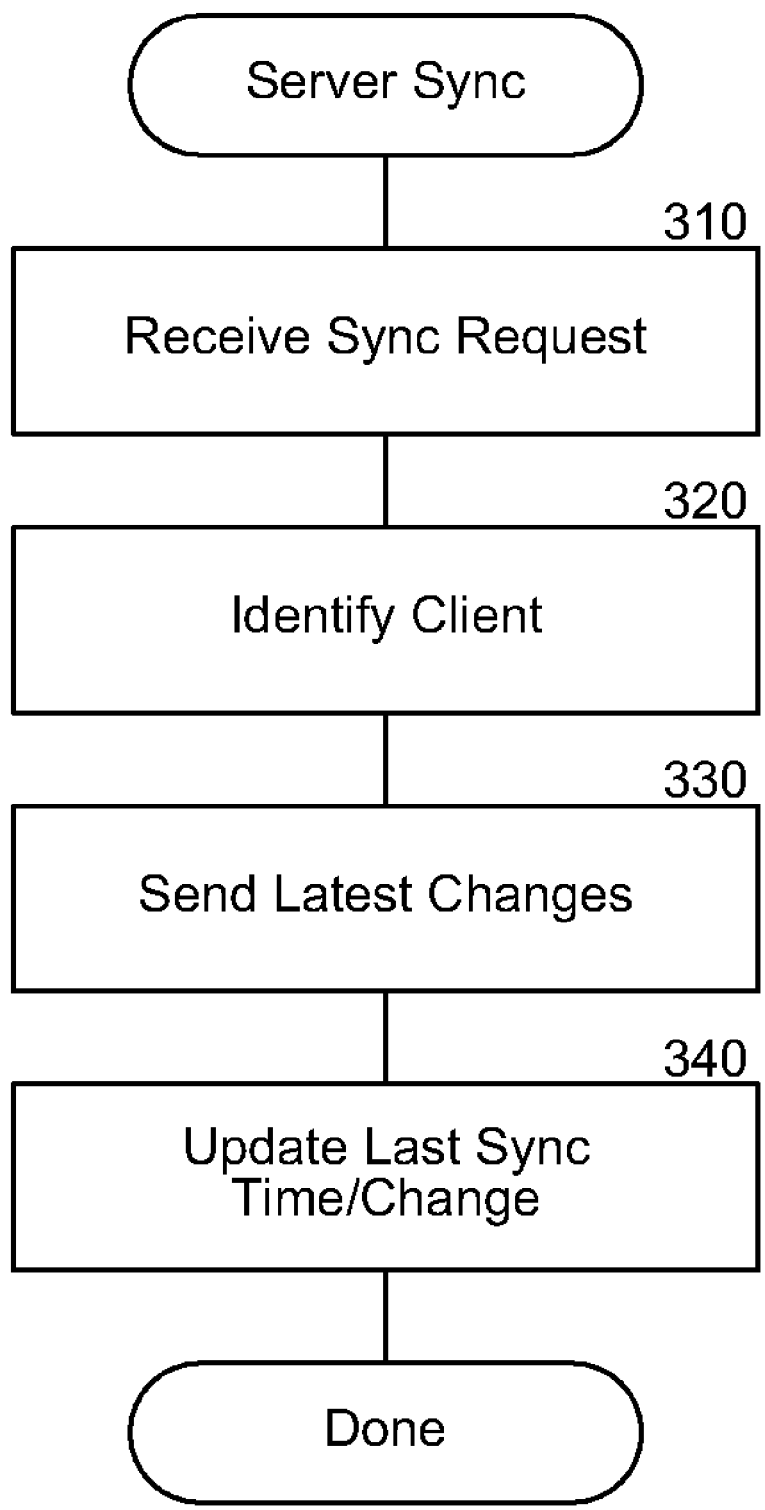
FIG. 3 is a flow diagram that illustrates the processing of the sync component to synchronize changes between a server and client, in one embodiment.

FIG. 3 is a flow diagram that illustrates the processing of the sync component to synchronize changes between a server and client, in one embodiment. These steps are invoked when a client requests updated information from the server and the client does not have any changes of its own to upload. In block 310, the component receives a sync request from the client. For example, a user may have requested a sync operation through a user interface at the client, and the client may send a sync request to the server. In block 320, the component identifies the client and determines the last time the client synchronized with the server. For example, the component may access a database of client information to determine the last change that the client received. In block 330, the component sends the latest changes to the client. The changes may only include those changes that have occurred since the client last synchronized based on the client information (e.g., to save bandwidth). In block 340, the component updates the client information with the current version synchronized to the client and/or the current time so that the component will know what information the client does not have when the next sync request is received.

Figure 4:
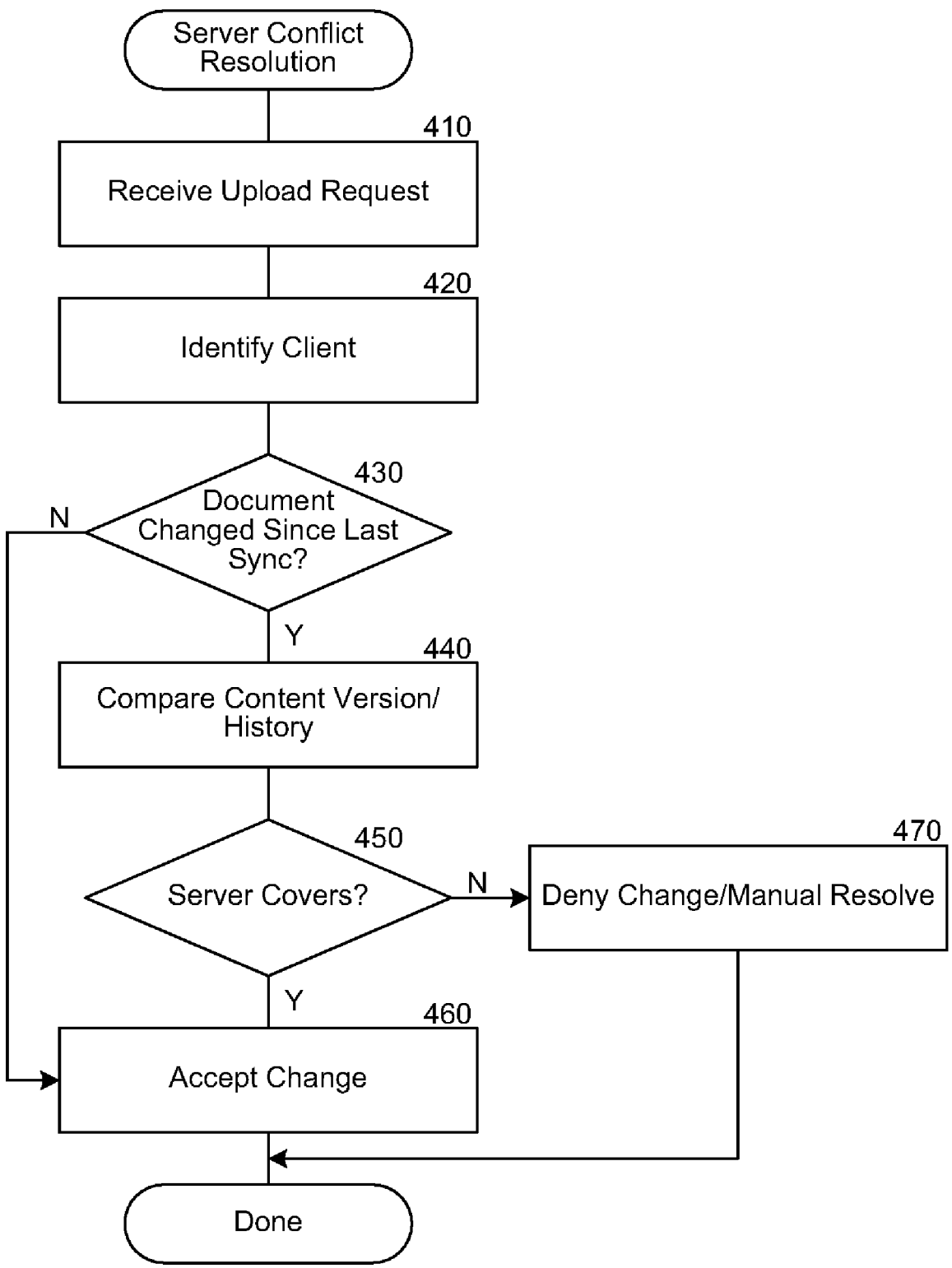
FIG. 4 is a flow diagram that illustrates the processing of the conflict resolution component to resolve changes at the server, in one embodiment.
Figure 5:
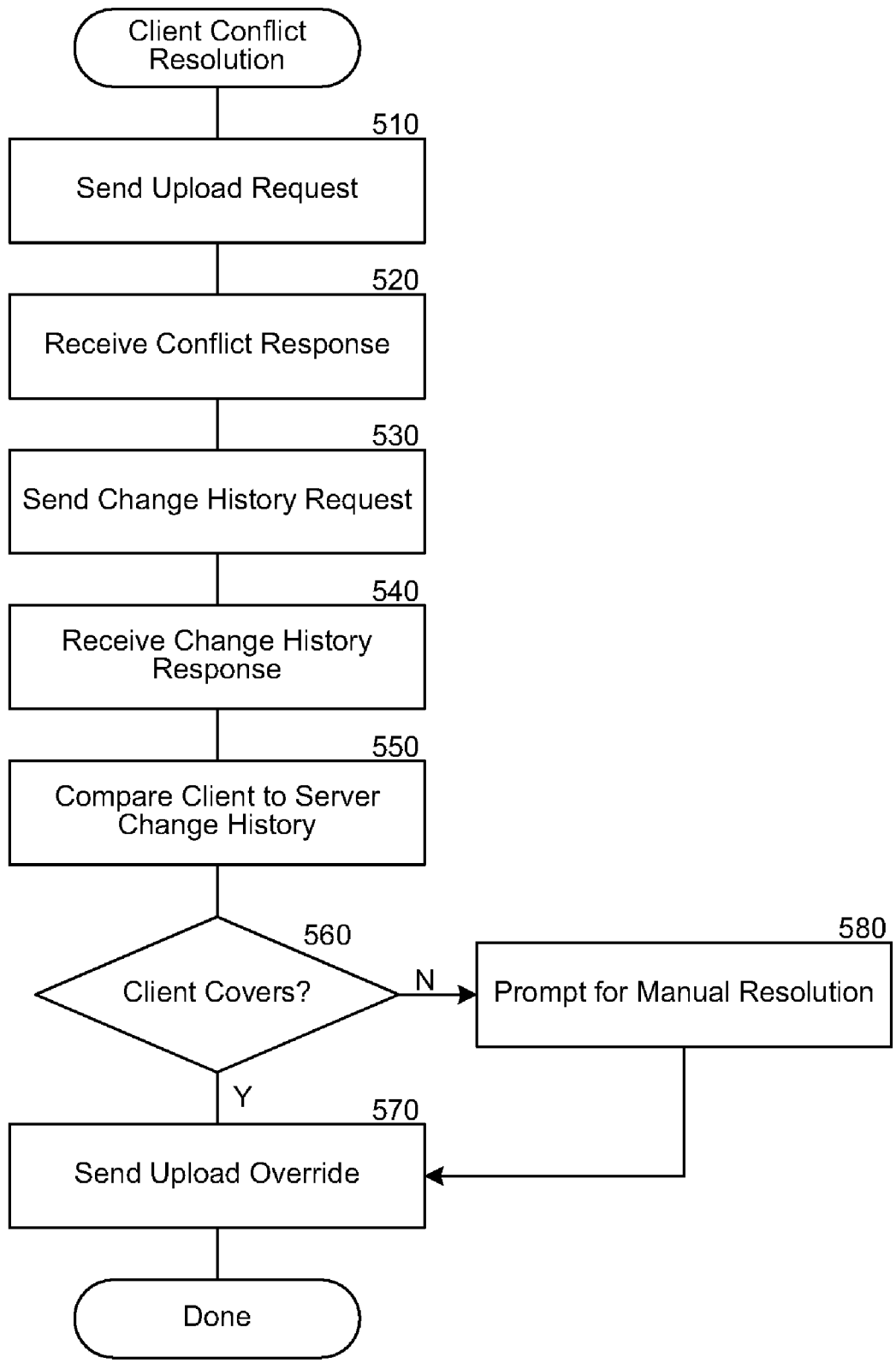
FIG. 5 is a flow diagram that illustrates the processing of the conflict resolution component to resolve changes at the client, in one embodiment.

FIGS. 4 and 5 are flow diagrams that illustrate two alternative methods of conflict resolution, one where conflict resolution is performed by the server, and another where conflict resolution is performed by the client. The conflict resolution may use either or both of the illustrated methods based on factors such as available resources at the server, trustworthiness of the client, and so forth.

FIG. 4 is a flow diagram that illustrates the processing of the conflict resolution component to resolve changes at the server, in one embodiment. In block 410, the component receives an upload request that includes information about at least one document. For example, the client may request to synchronize changes to a document with the server. In block 420, the component identifies the client and accesses client-specific state information. For example, the server may use the information to determine when the identified client last synchronized with the server and whether the document has been changed by other clients since the identified client last synchronized. In decision block 430, if the document has changed since the identified client last synchronized, then the component continues at block 440, else no conflict exists and the component continues at block 460. For example, other clients may have uploaded changes to the same document while the identified client was modifying the document. In block 440, the component compares the content version uploaded by the client with the change history of content versions synchronized with the server. Alternatively or additionally, the component may compare a latest content version of the server with the content version or a history of changes provided by the identified client. In decision block 450, if the server's knowledge covers the knowledge of the identified client (or the content versions match), then the component continues at block 460, else a real conflict exists the component continues at block 470. In block 460, either there was no conflict or the component automatically resolves what was a false conflict and accepts the change uploaded by the client. In block 470, the component denies changes related to real conflicts and may prompt the user to manually resolve the conflict. After blocks 460 and 470, these steps conclude.

FIG. 5 is a flow diagram that illustrates the processing of the conflict resolution component to resolve changes at the client, in one embodiment. In block 510, the component sends an upload request with an updated document. For example, a client may send an updated document to a server in a client/server CMS. In block 520, the component receives a conflict response indicating that the uploaded document conflicts with changes uploaded by another client. For example, a user may modify the same document as another user, creating a conflict. In block 530, the component sends a request to retrieve change history about the document. For example, the client may use a web service method to request change history information from the server. In block 540, the component receives the change history response that enumerates the changes made to the document by various clients. In block 550, the component compares a local history of changes to the document with the received change history information. In decision block 560, if the local change information includes the change information provided by the server, then the component continues at block 570, else the component continues at block 580. In block 570, after determining that the conflict is a false conflict, the component uploads the document again and indicates that the uploaded instance overrides the server's instance of the document. In block 580, after determining that the conflict is a true conflict, the component prompts the user to manually resolve the conflict. If the user is able to resolve the conflict, then the component may continue at block 570 and upload the document again. After block 570, these steps conclude.

As illustrated in FIG. 4 and FIG. 5 the conflict resolution system can operate using several alternatives. In one embodiment, the server tracks a latest content version and each client tracks a change history. When the client uploads a document, the client checks to determine whether the server's latest content version is included in the client's change history. If it is, then the client's version of the document can be uploaded and any conflict is a false conflict. In another embodiment, the client receives a change history from the server that identifies whether changes are to the content or metadata of the document. If the client's change history or knowledge includes the changes in the server's change history that affect the content of the document, then the client can upload the document without a real conflict.

Figure 6:
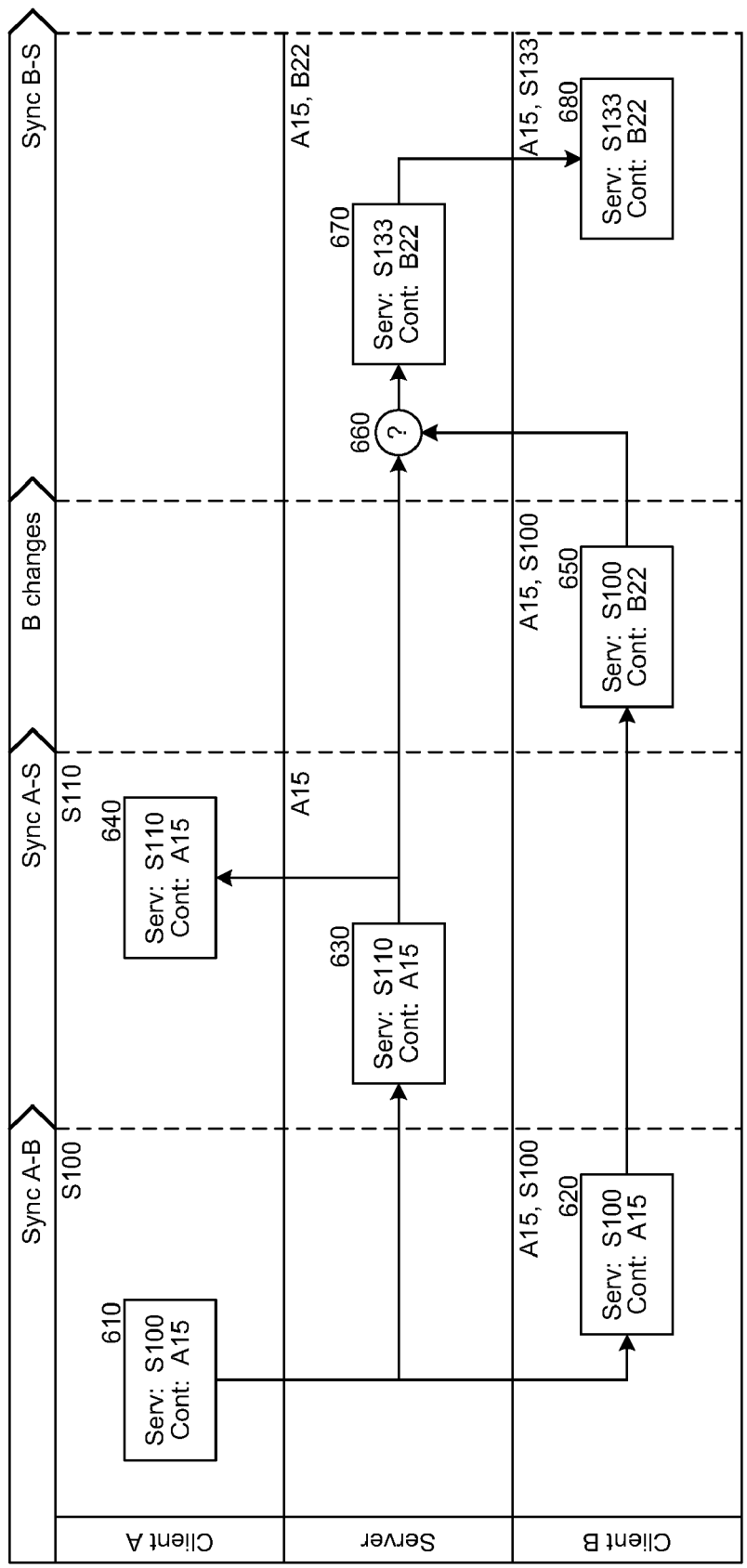
FIG. 6 is a data flow diagram that illustrates an example of the conflict resolution system automatically resolving a conflict, in one embodiment.

FIG. 6 is a data flow diagram that illustrates an example of the conflict resolution system automatically resolving a conflict, in one embodiment. In the diagram, each actor (Client A, Client B, and Server) maintains a content version number that increases with each change and is preceded by the identity of the actor. The Server also maintains a server version number that is updated with each synchronization with the Server. For example, the version A10 indicates the tenth version of a document according to Client A. The numbers in the upper right of each box indicate the endpoints knowledge (e.g., as a change history list) at the end of a phase. At the start, Client A synchronizes with the Server and obtains Server version S100 of a document. Client A modifies 610 the document, giving it content version A15, and then synchronizes 620 the document with Client B. Client B then has Server version S100, content version A15, and knowledge that includes the list: A15, S100. Then, Client A synchronizes 630 the document with the Server. The Server gives the document server version S110 and stores the content version A15 from Client A. Client A also updates 640 its server version to S110 as part of the synchronization.

Next, Client B modifies 650 the document, giving it content version B22. At point 660, Client B attempts to synchronize with the Server, and a conflict occurs because the version of the document at the server has been updated by another client (Client A) since Client B last synchronized with the Server. The Server is unaware the Client B actually obtained the changed version of the document from Client A. Using the conflict resolution process described herein, either the Server or Client B can determine that there is no conflict by comparing the content version of the server and Client B's content version information (e.g., a content version, change history, or other knowledge). Because Client B's knowledge encompasses Client A's change, there is no real conflict and the conflict resolution system resolves the conflict automatically. The Server accepts 670 Client B's change, assigns it server version S133, and updates the Server's content version to B22. Client B also updates 680 its server version to S133 as part of the synchronization.

In some embodiments, the conflict resolution system maintains backwards compatibility for proper operation with older clients. Clients that do not incorporate the system, such as a web client or Microsoft Outlook or other personal information manager (PIM), may connect to the server. The conflict resolution system adds new version fields rather than modifying existing fields. Older clients use the existing fields as they did before, while the server benefits from newer clients that provide the extended fields for avoiding false conflicts. Thus, both new and old clients can interact with the server and the server can still save resources and editors' time when new clients are used for synchronization. If an old client updates a document, the server clears the new fields so that new clients that connect can determine that the document has been updated since they last synchronized.

In some embodiments, the conflict resolution system receives content changes from the server as well as clients. For example, the server may perform actions that modify the content of a document, such as performing an anti-virus check and removing a detected virus from the document. In such cases, it is desirable for clients to synchronize the new version containing the server modification. Thus, the server updates the content version in such cases so that connecting clients will pick up the new version during a synchronization operation.

From the foregoing, it will be appreciated that specific embodiments of the conflict resolution system have been described herein for purposes of illustration, but that various modifications may be made without deviating from the spirit and scope of the invention. For example, although the system has been described as applied to content management, the system can be used equally well for any system where multiple parties make modifications to content. Likewise, although documents have been used for examples, other types of modifiable content can also be used with the system, such as audio, video, web pages, records in a database, and so forth. Accordingly, the invention is not limited except as by the appended claims.

We claim:

1. A computer-implemented method for automatically resolving at a server changes made by multiple clients, the method comprising:
   receiving from a first client a first updated instance of a document and a first document content version, wherein a document content version is a separate version indicator from a typical document version and changes only when the document content changes but not when document metadata changes;
   updating a stored instance of the document with the first updated instance of the document;
   receiving from a second client a second updated instance of the document and a second document content version that matches the first document content version, wherein the second client has not received from the server an updated instance of the document since the server received the first updated instance of the document;
   determining that the second updated instance is derived from the first updated instance based on the first and second document content versions; and
   updating the stored instance of the document with the second updated instance of the document without notifying the second client of a conflict.

2. The method of claim 1 wherein the first document content version identifies the client that last modified the document.

3. The method of claim 1 wherein the second client receives from the first client the first updated instance of the document by peer-to-peer synchronization.

4. The method of claim 1 further comprising storing a list of changes made to the document.

5. The method of claim 1 further comprising, after updating the stored instance of the document with the second updated instance, storing the second document content version as a server document content version.

6. The method of claim 5 wherein the server does not update the server document content version when the server modifies metadata of the document.

7. The method of claim 1 further comprising, maintaining a server document version for backwards compatibility that changes whenever the server or a client modifies the document.

8. The method of claim 1 wherein the server, first client, and second client are members of a client/server content management workspace and the first client and second client are members of a peer-to-peer content management workspace.

9. The method of claim 1 wherein the server, first client, and second client are connected via the Internet, and the first client is also connected to the second client via a LAN, such that when a connection to the Internet is unavailable, the first client can still synchronize the document with the second client.

10. The method of claim 1 further comprising, when the server modifies content of the document, updating a server document content version.

* * * * *